United States Patent Office 3,404,098
Patented Oct. 1, 1968

3,404,098
PLATINUM GROUP METAL CATALYSTS SUPPORTED ON RARE EARTH CARBONATES
Alvin B. Stiles, Wilmington, Del., assignor to E. I. du Pont de Nemours and Company, Wilmington, Del., a corporation of Delaware
No Drawing. Filed Dec. 23, 1965, Ser. No. 516,106
9 Claims. (Cl. 252—443)

ABSTRACT OF THE DISCLOSURE

The present disclosure relates to platinum group metal catalysts. A platinum group metal is supported upon a rare earth hydroxy carbonate, sometimes called a basic carbonate, to minimize formation of unwanted products in the hydrogenation of substituted cyclic rings.

This invention relates to platinum group metal catalysts. It is more particularly directed to platinum group metals such as ruthenium supported upon one or more rare earth hydroxy carbonates.

Use of platinum group metals, such as ruthenium supported upon conventional carriers such as alumina or silica-aluminas, for hydrogenation reactions lead to the production of unwanted by-products. The tendency towards side reactions is particularly great in the hydrogenation of substituted cyclic rings.

According to the present invention a platinum group metal is supported upon a rare earth hydroxy carbonate, sometimes called a basic carbonate, to minimize formation of unwanted products particularly in the hydrogenation of substituted cyclic rings as will be hereinafter illustrated.

The platinum group metals, ruthenium, rhodium, palladium, osmium, iridium, and platinum, are used in the customary manner as the metal or as a salt readily reducible to the metal. Such readily reducible salts include the chlorides of the platinum group metals or the nitrates in those instances where they can be formed. The platinum group metal-chloride is customarily converted to a carbonate, hydroxy carbonate, oxide, or even where possible a nitrate, all of which are relatively unstable and easily reduced to the metal. Reduction of these salts can be attained using hydrogen, formaldehyde, alcohol vapors, ethanol or methanol solutions, in any of the numerous conventional procedures for reducing a platinum group salt to the metal. Platinum and palladium chlorides can be used as such upon the carriers of this invention as they are easily converted to the oxide upon heating which in turn readily decomposes to the metal.

For the purposes of this invention is is important that crystallite size of the catalyst be kept at a minimum, preferably below 400 angstroms and most preferably below about 100 angstroms. Customary procedures as described will produce platinum group metal catalysts having crystallite sizes in the above ranges, but care must be taken not to heat the catalyst for such a time as to cause crystallite growth outside of the desired range. Reducing temperatures for example of about 600° C. for three hours tend to cause the crystallite size of the catalyst to grow in excess of the desired range. Higher temperatures such as, say, 800° C. for thirty minutes results in similar growth. The conditions mentioned are borderline conditions and crystallite size should be checked if such severe conditions are encountered.

The crystallite size can be determined most easily by low angle X-ray diffraction patterns made in a conventional manner. As previously indicated the most preferred products of the invention are those in which crystallinity is apparent which indicates a crystallite size of around 80 to 100 angstroms or below.

According to this invention, a platinum group metal is supported upon any one of the rare earth metal hydroxy carbonates or, preferably, upon hydroxy carbonates of a mixture of rare earth metals. Numerous commercial mixtures are available of rare earth metals or rare earth metal compounds obtained as a by-product to the isolation of individual rare earths. Thus there are mixtures available such as the by-product, often called didymium, which results from removal of cerium from the naturally occurring mixture of rare earth metals. There are similar mixed rare earth by-products available which are produced when lanthanum, praseodymium or europium are separated from the naturally occurring mixtures.

The rare earth metals are lanthanum, cerium, praseodymium, neodymium, promethium, samarium, europium, gadolinium, terbium, dysprosium, holmium, erbium, thulium, ytterbium, yttrium and lutetium. The rare earth hydroxy carbonates can be typified by cerium hydroxy carbonate which has the following empirical formula:

$$Ce_2(CO_3)_3 \cdot Ce(OH)_3$$

The other rare earth metals form similar basic carbonates or as we here prefer to call them, hydroxy carbonates.

The proportion of carbonate in the composition can be widely varied according to the invention particularly since, as will become apparent hereinafter, the carbonate and hydroxy compounds are both in large part converted to the oxide by calcination.

Generally it can be said that the rare earth metal hydroxy carbonate should contain from 20 to 95% of the $CO_3$ theoretically required to form the rare earth metal carbonate.

The rare earth hydroxy carbonates can be prepared by conventional processes. Thus a soluble salt, such as the chloride, nitrate, acetate or the like, of a rare earth metal or a mixture of rare earth metals, can be dissolved in water and can be precipitated as the carbonate using sodium or potassium carbonate.

The amount of hydroxyl groups or the extent of the basicity of the catalyst supports of this invention can be varied depending upon the temperature at which the carbonate precipitation is effected. At higher temperatures there is more decomposition of the carbonate to the hydroxyl form. Hydroxyl groups can be introduced alternatively by using some sodium hydroxide or ammonium hydroxide together with the carbonate as a precipitant.

After precipitation the precipitate can be separated such as by filtration of centrifugation and washed with water or preferably with a solution containing carbonate thus to remove soluble foreign ions.

Products produced by precipitation as described will normally have a crystallite size below about 100 angstroms. If the product is dried at elevated temperatures there is a tendency for crystallite size to grow and extensive drying or calcination at elevated temperatures should be avoided at all stages of preparation of the products of the invention. As already mentioned, care should be taken to prevent the crystallite size from going much above 400 angstroms and preferably the size will be kept at less than about 100 angstroms.

The precipitate prepared as described can be ground with the platinum group metal compound and the ground material prepared in suitable form for use as a catalyst. Thus the mixtures can be formed as pellets, extruded shapes, granules or other suitable forms. Alternatively, the hydroxy carbonate can be formed into a suitable shape and thereafter coated or impregnated by treatment with a slurry of the platinum group metal. The latter method helps to conserve the more costly platinum group metal catalyst particularly in instances where it is desired to have relatively large shapes such as rings in a catalyst bed.

The amount of the platinum group compound used with the hydroxy carbonate carrier can in accordance with customary practices be very widely varied. While amounts as low as 0.0001% can be used, ordinarily one will not use less than about 0.01% of the platinum group metal computed as metal and based upon the total weight of catalyst including the hydroxy carbonate. The upper limit for the amount of platinum group metal is based purely on practicality. In amounts above about 10% the catalytic metal will for a large part begin to be coated upon other particles of the platinum group metal compound because there will not be sufficient surface of the carrier. Thus it is ordinarily practical to use about 0.01 to about 10% of the platinum group metal based upon the total weight of composition and it is usually preferred to use amounts of about 2 to 5% by weight of the platinum group metal.

A composite in the form of granules or other shapes including the platinum group metal compound supported upon a rare earth hydroxy carbonate can be charged directly into a hydrogenation reactor, for example. The temperatures of use are such that there will be conversion of the platinum group metal compound to the metal and a partial conversion of the hydroxy carbonate to oxide. The extent of the latter conversion will depend upon the temperatures.

It is customary however to effect calcination of the supported catalyst before charging it to a reactor. Thus such a composite can be heated to a temperature of about 125° to about 500° C. It is preferred to use a temperature of less than 300° C. and in any event heating should not be extended beyond the time required to effect the desired calcination of the product. Typical conditions will be given in the examples hereinafter.

Upon heating as described in the presence of hydrogen the compound of the platinum group metal will be converted to the metal and the hydroxy carbonate will be converted to an oxide containing some carbonate. The conversion to oxide should not proceed to such a point that the carbonate has entirely been decomposed. The extent of conversion of the support and the amount of carbonate remaining in the oxide, which is formed on decomposition of the hydroxy carbonate, can readily be determined by the addition of an acid such as hydrochloric to the product and measuring gas evolution. The carbonate, $CO_3$, in the starting rare earth metal compound can be computed from the evolution of $CO_2$ and should as stated previously, range from about 20 to 95% of the theoretical amount of $CO_3$ required to combine with all of the rare earth metal.

The rare earth metal hydroxy carbonate heated as above described will go to the oxide, with respect to the hydroxy present, almost quantitatively even at temperatures below 200° C. The carbonate conversion to oxide will depend upon the temperature and time of heating. According to this invention the $CO_3$ remaining after heating the rare earth metal compound, as determined by measurement of $CO_2$, should be from about 5 to about 80% by weight of that theoretically required to combine and form carbonates with the rare earth metals present.

Catalysts of the invention can be formed in the variety of ways described and numerous other methods will be evident to one skilled in the art. Thus an unstable compound of the platinum group metal such as the nitrate of ruthenium or palladium and the hydroxy carbonates of any of the rare earth metals can be slurried in water and evaporated to dryness, depositing the platinum group metal compound upon the rare earth hydroxy carbonates, following by decomposition of both as previously described. Alternately the rare earth hydroxy carbonate can first be decomposed to the oxide containing some carbonate and this treated with a slurry of a platinum group metal compound which is then decomposed.

Catalysts prepared as above described can be used for carbonylations such as carbon monoxide and hydrogen to form mixed long chain alcohols. They are particularly well suited for the hydrogenation of substituted cyclic compounds such as nitrobenzene to aniline or aminocyclohexane, methylenedianiline to para-aminocyclohexyl methane, dicyanobutene to dicyanobutane and further to hexamethylene diamine, and acetylene to ethylene in the presence of ethylene.

In addition to such hydrogenations, for which the catalysts are especially preferred, they can be used for any of the reactions for which the platinum group metals have heretofore been employed, such as oxidations of odorous and objectionable fumes to carbon dioxide, hydrogen and nitrogen thus producing non-objectionable products.

In order that the invention may be better understood, reference should be had to the following illustrative examples, wherein parts and percentages are by weight.

Example 1

(1) One thousand parts by weight of water is placed in a reaction vessel fitted with an agitator. To this there is added ruthenium chloride in the amount of 5 parts by weight of ruthenium metal. The ruthenium chloride is dissolved in the water and the solution is heated to 70° C.

(2) There is separately prepared a solution of 100 parts by weight of ammonium carbonate in 1000 parts by weight of distilled water.

(3) A purchased mixture of rare earth hydroxy carbonates, having the following composition calculated on a $CO_2$ free basis and computed as oxides, is calcined in air at 400° C. for three hours:

| | Percent |
|---|---|
| $CeO_2$ | 47 |
| $La_2O_3$ | 24.5 |
| $Nd_2O_3$ | 19.5 |
| $Pr_2O_3$ | 6.0 |
| $Sm_2O_3$ | 2.0 |
| $Gd_2O_3$ | 0.5 |
| Yttrium and other rare earths | 0.5 |

The carbonate content of the rare earth hydroxy carbonates measured as $CO_2$ and computed as $CO_3$ is about 60% of the $CO_3$ theoretically combinable with the rare earth metal. After calcination the $CO_2$ content is determined by adding dilute hydrochloric acid to the rare earth compounds and measuring $CO_2$ evolution. The $CO_2$ content is found to be about 37% of that theoretically combinable with the amount of rare earth metal present to form the rare earth carbonates.

(4) The solution prepared in Item 2 is added as a spray to the solution prepared in Item 1 until a pH of 4.0 has been reached. Thereafter there is added to the solution 100 parts by weight of a mixture of rare earth oxide carbonates prepared in Item 3.

(5) Addition of the ammonium carbonate solution is then resumed and continued until the pH has increased to 8.1 to precipitate the ruthenium chloride on the mixed rare earth oxide carbonates.

(6) After the completion of the precipitation the slurry is digested at 70° C. for sixty minutes.

(7) The slurry is then filtered and washed on the filter with a solution of 2000 parts by weight of water and 100 parts by weight of ammonium carbonate dissolved in the water.

(8) After filtration the filter cake is dried at 125° C. for twelve hours. The dried filter cake is next placed in a heated cylindrical vessel fitted with connections for introduction of hydrogen at one end and exhausting gaseous products at the other end.

(9) The catalyst prepared as above is charged into the vessel and reduced at 200° C. until water ceases to come off thus indicating completion of reduction of the ruthenium.

It is noted that the filter cake can before reduction with hydrogen be formed into appropriate shapes such as cylinders one-eighth inch long by one-eighth inch diameter or similar shapes and can thereafter be reduced with hydrogen.

The crystallite size of the rare earth oxide carbonates is about 225 angstroms and of the ruthenium is less than 80 angstroms. The crystallite size of the ruthenium is determined by dissolving away the rare earth compound with dilute hydrochloric acid and determining by low angle X-ray diffraction the crystallite size of the remaining ruthenium metal thus isolated. The crystallite size of the rare earth metal compound is also determined by low angle X-ray diffraction in the presence of the ruthenium which being so much smaller does not interfere with the determination. In any event, for purposes of the invention, it is only important that crystallites of both be below the ranges previously mentioned.

Example 2

(1) A solution is prepared by dissolving 2 parts by weight of ruthenium as ruthenium chloride in 1000 parts by weight of water.

(2) A second solution is prepared by dissolving 100 parts by weight of ammonium carbonate in 1000 parts by weight of distilled water.

(3) A purchased mixture of rare earth hydroxy carbonates, having a carbonate content of 65% of theoretical and the following composition calculated on a $CO_2$-free basis and computed as oxides is calcined at 500° C. for three hours:

| | Percent |
|---|---|
| $CeO_2$ | 48 |
| $La_2O_3$ | 34 |
| $Pr_2O_3$ | 4 |
| $Nd_2O_3$ | 13 |
| $Sm_2O_5$ | 0.6 |
| $Eu_2O_3$ | 0.15 |
| $Gd_2O_3$ | 0.30 |
| $Y_2O_3$ | 0.13 |
| $Pm_2O_3$, $Tb_2O_3$, $Dy_2O_3$, $HO_2O_3$, $Er_2O_3$, $Tm_2O_3$, $Yb_2O_3$, $Lu_2O_3$ | .30 |

The resulting powder has a carbonate content of 21% of the theoretical amount required to form carbonates with all the metal.

(4) The solution prepared in Item 1 is heated to 75° C. and while being agitated, solution 2 is added dropwise until a pH of 4.0 is reached.

(5) At this point 100 parts by weight of the finely divided rare earth oxide carbonate mixture of Item 3 is added to produce a slurry.

(6) The addition of the ammonium carbonate solution is then resumed and is continued until a pH of 8.1 is reached.

(7) After precipitation is complete the slurry is digested at 75° C. for forty minutes.

(8) The slurry is then filtered and washed with an ammonium carbonate solution as in Item 7 of Example 1. The filter cake is dried at 150° C. for twelve hours.

(9) Some of the rare earth oxide carbonate powder prepared in Item 3 above is formed into one-eighth inch by one-eighth inch right cylinders by pilling on a Stokes press and are coated with a slurry of the dried filter cake prepared in Item 8 above. This slurry, which contains 15% solids and the balance water, is coated upon the cylinders to produce a weight when dried of 20% of the original weight of the cylinders as the added material.

The coated cylinders thus produced are reduced with hydrogen at 225° C. The crystallite size of the resultant rare earth oxide carbonates is about 290 angstroms. The ruthenium crystallite size is less than 80 angstroms.

The catalyst thus produced is useful in the fixed bed hydrogenation of methane dianiline to para-aminocyclohexylmethane and other hydrogenation and oxidation reactions as above described.

Example 3

(1) 250 parts by weight of water is placed in a reaction vessel fitted with an agitator. To this there is added rhodium chloride equivalent to the amount of 5 parts by weight of metallic rhodium. The rhodium chloride is dissolved in the water and the solution is heated to 65° C.

(2) There is separately prepared a solution of 100 parts by weight of ammonium carbonate in 1000 parts by weight of distilled water.

(3) A purchased mixture of rare earth hydroxy carbonates which have been derived by isolating a stream from the rare earth salts purification operation which has all constituents removed from the exception of the cerium, praseodymium and lanthanum, has the following composition:

| | Percent |
|---|---|
| Cerium oxide | 62 |
| Praseodymium oxide | 19 |
| Lanthanum oxide | 19 |

All the rare earths are present as the partially decomposed carbonates but the analysis is expressed on the carbon dioxide free basis. These rare earths have been processed to produce the hydroxy carbonates and are the raw material from which the oxide carbonates used in this example are derived by the following reprocessing technique: (a) after isolating the crude rare earth carbonates of the cerium, lanthanum and praseodymium composition, 1000 parts of these carbonates are slurried in 10,000 parts of distilled water and sufficient nitric acid is added to completely dissolve the carbonates; (b) thereafter with the solution being agitated and with a solution of 10% ammonium bicarbonate being sprayed into the nitrate solution, precipitation is effected by adding ammonium bicarbonate solution at 50° C. until a pH of 7.5 is reached; (c) the carbonates are then filtered, dried and calcined at 200° C. to yield the rare earth oxide carbonates empolyed in this example.

(4) The solution prepared in Item 2 is added as a spray to the solution prepared in Item 1 until a pH of 3.8 has been reached. Thereafter there is added to the solution 100 parts by weight of mixed rare earth oxide carbonates of Item 3.

(5) Addition of ammonium bicarbonate solution is continued until the pH has been increased to 8.1 to precipitate the rhodium chloride on the mixed rare earth oxide carbonates.

(6) After completion of the precipitation, the slurry is digested at 65° C. for 90 minutes.

(7) The slurry is then filtered and washed on the filter with a solution consisting of 2000 parts by weight of water in which 100 parts by weight of ammonium bicarbonate is dissolved.

(8) After filtration the filter cake is dried at 125° C. and thereafter the filter cake is placed in the reduction vessel described in Item 8 of Example 1 and is reduced according to the instructions of Item 9 of Example 1.

The catalytic material thus produced is effective for the hydrogenation of double bonds such as ethylene to ethane, benzene to cyclohexane, dicyanobutene to adiponitrile, and adiponitrile to hexamethylenediamine. Furthermore, it is effective for the hydrogenation of benzonitrile to cyclohexylnitrile and ultimately to aminomethylcyclohexane.

The carbon dioxide content of the mixed rare earth hydroxy carbonates before calcining is 95% of theoretical and after calcining it is 80% of theoretical. The crystallite size of the rare earth carbonates after calcining is 90 angstroms and the crystallite size of the rhodium is less than 80 angstroms.

Instead of the rhodium specified in Item 1, there can be used platinum chloride or palladium chloride of a stoichiometric equivalent amount to prepare similar catalysts.

Example 4

(1) A solution is prepared consisting of 2 parts of ruthenium metal as the nitrate dissolved in 150 parts by weight of distilled water.

(2) 1100 parts by weight of a 10% solution of ammonium carbonate in distilled water is prepared.

(3) A mixture of rare earth hydroxy carbonates having a composition, on a $CO_2$-free basis and expressed as the oxides, of the following:

| | Percent |
|---|---|
| Cerium oxide | 43 |
| Praseodymium oxide | 5 |
| Samarium oxide | 5 |
| Europium oxide | 5 |
| Gadolinium oxide | 3 |
| Terbium oxide | 1 |
| Dyprosium oxide | 2 |
| Holmium oxide | 2 |
| Erbium oxide | 6 |
| Thulium oxide | 3 |
| Ytterbium oxide | 4 |
| Lutetium oxide | 4 |
| Lanthanum oxide | 17 | is calcined at 800° C. for 3 hours.

(4) The solution prepared in Item 1 is heated to 75° C. and while being agitated the solution of Item 2 is added slowly until a pH of 4.2 is reached.

At this point 100 parts by weight of the mixture of finely divided rare earth oxide carbonates of Item 3 are added to produce a slurry.

(5) The addition of the ammonium carbonate solution is continued until a pH of 7.8 is reached. After this pH has been reached, digestion is effected for the slurry for 45 minutes at 75° C.

(6) Thereafter the slurry is filtered and washed with 500 parts by weight of a 10% solution of ammonium carbonate.

(7) Next the filter cake is dried at 150° C. for 12 hours.

(8) The dried filter cake is pulverized to pass 100% through a 200 mesh screen, then is reduced at 225° C. with hydrogen.

The catalyst thus produced is effective for hydrogenations in general.

The crystallite size of the calcined rare earth carbonates on which the ruthenium is coated is 300 angstroms, whereas the crystallite size of the ruthenium is less than 80 angstroms.

The carbon dioxide content of the rare earth hydroxy carbonates used in this example is 70% of theoretical prior to calcining and is 5% of theoretical after calcining. The apparent density of the catalyst prepared from the rare earth hydroxy carbonates calcined at 800° C. is approximately 1.00 g./ml. which is denser than preparations from carbonates calcined at lower temperatures. The effectiveness of the high density material is particularly noticeable in those operations in which the hydrogenation slurry is withdrawn via dip tube in the reaction slurry. Because of the higher density of the catalyst prepared, it is possible to withdraw a relatively catalyst-free upper layer of liquid product, thus minimizing filtration requirements.

A preparation similar to that described above can be used with the exception that the rare earth hydroxy carbonates are calcined at 600° C. Thereafter the carbonate content of this preparation is 36% of theoretical. Also instead of the ruthenium nitrate specified, there can be used palladium nitrate to achieve a similarly catalytic effective material.

Example 5

(1) An aqueous solution is prepared comprising 50 parts by weight of water and 2 parts by weight of ruthenium as nitrate and 2 parts by weight of ruthenium as sodium perruthenate.

(2) Finely divided rare earth hydroxy carbonates having a carbon dioxide free composition of 2% cerium oxide and 4% lanthanum oxide and the remaining being oxides of promethium 15%, samarium 15%, gadolinium 8%, terbium 3%, dysprosium 5%, holmium 5%, erbium 15%, thulium 8, ytterbium 10%, lutetium 10%, are calcined at 400° C. for 3 hours.

(3) 100 parts by weight of the calcined rare earth carbonates from Item 2 are impregnated with the solution derived in Item 1 above. Thereafter the paste is heated and stirred until the salts have been deposited uniformly on the rare earth carbonate-oxide mixture.

(4) The dried product thus produced is pulverized so that is passes 100 through a 200 mesh screen. Thereafter it is reduced at 200° C. in a stream of hydrogen.

The crystallite size of the catalyst thus produced is 260 angstroms for the rare earth component and 380 angstroms for the ruthenium component. The catalyst is effective for the hydrogenation of methane dianiline to p-aminocyclohexane. It is also effective for selective hydrogenations in which triple bonds are to be hydrogenated to double bonds or one of a pair of conjugated double bonds is to be hydrogenated.

The carbon dioxide content of the rare earth hydroxy carbonates prior to coating with the precious metals salt is 75% of theoretical, whereas after impregnation and reduction the carbon dioxide content is 46%.

Instead of converting the dried cake of Item 3 to a powder, it can be crushed to 4–8 mesh and then reduced and used in the granular form in a fixed-bed reactor. Such catalyst is similarly effective for hydrogenations in general.

Catalysts are similarly prepared in which the following economically advantageous mixtures and individual carbonates are used instead of the mixture specified in Item 2 of Example 5. Individual carbonates of the following rare earth metals are used: cerium; praseodymium; neodymium; promethium; samarium; europium; gadolinium; terbium; dysprosium; holmium; erbium; thulium; yttrium; ytterbium; lutetium; and lanthanum. Mixtures of the carbonates of the following rare earth metals are also used:

cerium, praseodymium, and yttrium;
cerium, praseodymium, lanthanum and yttrium;
cerium and lanthanum;
praseodymium, gadolinium, yttrium and lanthanum;
praseodymium, neodymium, promethium, samarium, gadolinium, terbium, dysprosium, holmium, erbium, thulium, and ytterbium; and
praseodymium and neodymium.

Catalysts produced from the above rare earth compounds are effective for such hydrogenations as ring saturation in the presence of substituent groups, dicyanobutent hydrogenation to adiponitrile and then to hexamethylene diamine, nitrobenzene to aniline and then to cyclohexylamine and for hydrogenating carbon monoxide to aldehyde, alcohols and hydrocarbons.

Example 6

At a temperature of 230° C. and a hydrogen pressure of 3000 pounds per square inch gage in a suitable pressure vessel, 20 parts of para,para-methylenedianiline are hydrogenated for 30 minutes over 10 parts of the finely divided ruthenium and mixed rare earth oxides of Example 1.

The hydrogenated mixture is freed of the catalyst by filtration and is then distilled under vacuum to give the fully saturated mixture of isomers of para,para-di(aminocyclohexyl)methane in a yield of 99.3% based on the amount of methylenedianiline charged. The distilled product contains more than 45% of the trans,trans-stereoisome of para,para'-di(aminocyclohexyl)methane and is a solid at 25° C.

Repeating Example 6 using ruthenium supported on cerium oxide, containing 45% of the $CO_2$ theoretically required to form cerium carbonate, gives substantially identical results to those obtained in Example 6.

Example 7

In a steel autoclave fitted with a stirring apparatus and a product drawoff system such that the catalyst is retained in the reactor, there is charged 2000 parts of p,p'- methylenedianiline and 10 parts of finely divided supported ruthenium catalyst of Example 2.

The reactor contents are heated to 225° C. with stirring and hydrogen is added to maintain a pressure of 300 atomspheres. Additional p,p'-methylenedianiline is fed to the reactor at such a rate as to maintain a 60 minute resident time while the product is drawn off to maintain a fixed reactor volume.

The product is distilled under vacuum to give the fully saturated mixture of stereoisomers of para,para'-di(aminocyclohexyl)methane in excellent yield. The distilled product contains 48% of the trans,trans-stereoisomer of para,para'-di(aminocyclohexyl)methane.

Repeating Example 7 using the supported catalyst prepared in Example 3 gives similar outstanding results to those obtained in Example 7.

I claim:
1. A platinum group metal catalyst supported upon a rare earth hydroxy carbonate.
2. A catalyst of claim 1 in which the carbonate content of the hydroxy carbonate is from about 20 to 95% of the theoretical amount required to form the rare earth carbonate and in which the platinum group metal and the rare earth hydroxy carbonate each have a crystallite size below 400 angstroms.
3. A catalyst of claim 2 in which the platinum group metal is supported upon a mixture of rare earth hydroxy carbonates.
4. A catalyst of claim 3 in which the platinum group metal is ruthenium.
5. A platinum group metal catalyst supported upon a rare earth oxide which contains from about 5 to 80% of the theoretical amount of $CO_2$ required to form the rare earth carbonate.
6. A catalyst of claim 5 in which the metal catalyst and rare earth oxide each have a crystallite size no greater than 400 angstroms.
7. A catalyst of claim 6 in which the platinum group metal is supported upon a mixture of rare earth oxides.
8. A catalyst of claim 7 in which the platinum group metal is ruthenium.
9. In a process for making a supported platinum group metal catalyst, the steps comprising adding ammonium carbonate to an aqueous solution of a salt of a platinum group metal until the pH is raised to 4, thereafter adding finely divided rare earth carbonates and increasing the pH to 8 by further addition of ammonium carbonate, and then digesting the resultant slurry at a temperature greater than 50° C. for at least twenty minutes.

References Cited
UNITED STATES PATENTS

| | | | |
|---|---|---|---|
| 3,185,652 | 5/1965 | Kleber et al. | 252—462 X |
| 3,198,748 | 8/1965 | Keith et al. | 252—443 |
| 3,322,692 | 5/1967 | Clark | 252—462 |

PATRICK P. GARVIN, *Primary Examiner.*

C. F. DEES, *Assistant Examiner.*